(No Model.)
J. LA GRANGE.
MEASURING INSTRUMENT.
No. 590,230. Patented Sept. 21, 1897.
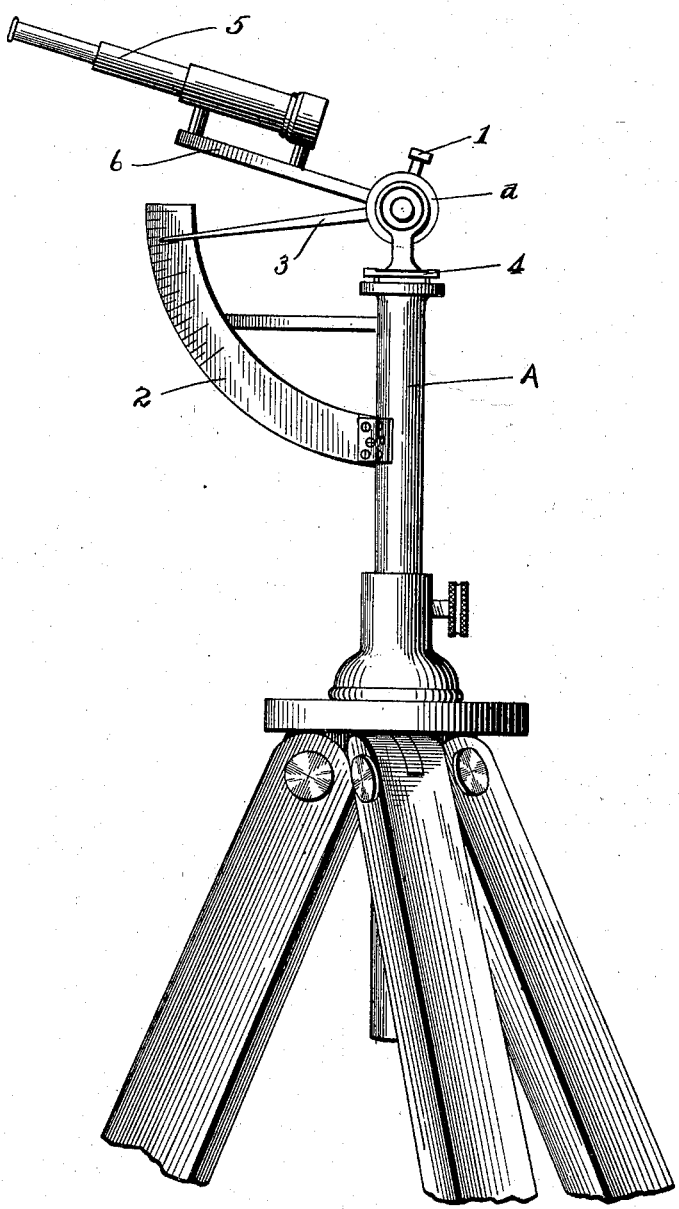
WITNESSES
F. B. Berry
George A. Byrne.
INVENTOR,
James La Grange,
by John Wedderburn
Attorney

UNITED STATES PATENT OFFICE.

JAMES LA GRANGE, OF McGILL, WEST VIRGINIA.

MEASURING INSTRUMENT.

SPECIFICATION forming part of Letters Patent No. 590,230, dated September 21, 1897.

Application filed November 11, 1896. Serial No. 611,768. (No model.)

*To all whom it may concern:*

Be it known that I, JAMES LA GRANGE, a citizen of the United States, residing at McGill, in the county of Putnam and State of West Virginia, have invented certain new and useful Improvements in Measuring Instruments; and I do hereby declare the following to be a full, clear, and exact description of the invention, such as will enable others skilled in the art to which it appertains to make and use the same.

My invention relates to an improvement in measuring instruments; and my object is to provide an instrument by which distances can be accurately measured upon flat surfaces, the present device being particlarly designed for use in measuring distances upon water.

To this end the invention consists in the various matters hereinafter described and claimed.

The accompanying drawing illustrates the present instrument.

Referring now more particularly to the drawing, A represents a standard to which the parts of the implement are attached. This standard can be adjustable in height, if desired. Pivoted upon the upper end of the standard is a plate $a$, by which is carried a straight-edge 1. A sector 2 extends from the standard toward the rear of the instrument, and a pointer 3, rigidly attached to the plate $a$, is adapted to travel along the sector in the movement of said plate about its pivot.

In order to insure the instrument being placed in a perfectly level position, a spirit-level 4 is provided upon the standard, and in order that the sight may be aided as much as possible a telescope is also attached. This telescope 5 is rigidly mounted upon a base-plate 6, carried by the pivoted plate $a$, this base-plate, the telescope, the straight-edge, and the pointer being all rigidly fixed upon the plate $a$. It will now be apparent that at any predetermined height the straight-edge 1 will always lie at the same angle to the standard when said straight-edge is turned upon an object a predetermined distance from the instrument. This being kept in mind, the sector 2 is marked with a suitable scale. Suppose the present device is to be used upon a ship (and this is the use for which it is particularly intended) and that the scale upon the sector 2 has been marked with the straight-edge 1 ten feet above the level surface upon which are supported both the present instrument and the object which was sighted in forming the scale on the sector. The instrument will be placed upon the shaft and the standard adjusted in height to bring the straight-edge 1 at ten feet above the water's edge. The device is now in position for operation. It is desired, say, to ascertain the distance of another vessel from the one upon which the present instrument is placed. The eye is applied to the telescope and the straight-edge is brought in direct line with the water-line of such other vessel. Of course the movement of the plate $a$ in order to bring the straight-edge in this direct line has carried with it the pointer 3 in such a manner as to move the end of said pointer along the scale upon the sector, and when the straight-edge has been brought in direct line with the water-line of the vessel the pointer will indicate the distance of said vessel.

It is thought that the operation of the device is apparent from the foregoing description.

Having thus described my invention, what I claim as new, and desire to secure by Letters Patent, is—

1. In a measuring instrument, the combination with a vertically-adjustable standard, of a pivoted plate carried thereby, a pointer and a base-plate extending from the pivoted plate upon the same side of the standard at an angle with respect to each other, a telescope carried by the base-plate, a straight-edge, or site, extending from the pivoted plate and located in axial alinement with the telescope and a graded sector rigidly secured to the vertically-adjustable standard, and designed to be traversed by the pointer.

2. A measuring instrument comprising a standard, a plate pivoted upon said standard, a straight-edge carried by said plate, a base-plate carried by said pivoted plate, a telescope upon said base-plate in line with the straight-edge, a pointer upon said pivoted plate, and a scale along which the pointer is adapted to travel, substantially as described.

In testimony whereof I have signed this specification in the presence of two subscribing witnesses.

JAMES LA GRANGE.

Witnesses:
J. T. WOMELDORFF,
L. D. AMOS.